(12) United States Patent
Dupre et al.

(10) Patent No.: US 8,086,362 B2
(45) Date of Patent: Dec. 27, 2011

(54) METHOD AND DEVICE FOR AIDING THE PILOTING OF AN AIRCRAFT

(75) Inventors: Alain Dupre, Pibrac (FR); Nicolas Ferret, Balma (FR); Philippe Foucault, Blagnac (FR)

(73) Assignees: Airbus Operations SAS, Toulouse (FR); Airbus, Blagnac (FR)

( * ) Notice: Subject to any disclaimer, the term of this patent is extended or adjusted under 35 U.S.C. 154(b) by 760 days.

(21) Appl. No.: 12/194,776

(22) Filed: Aug. 20, 2008

(65) Prior Publication Data

US 2009/0055037 A1 Feb. 26, 2009

(30) Foreign Application Priority Data

Aug. 22, 2007 (FR) ..................... 07 05957

(51) Int. Cl.
*G06F 19/00* (2011.01)
*G06D 1/00* (2006.01)
(52) U.S. Cl. ........... 701/14; 701/4; 701/5; 701/7; 701/8; 701/11
(58) Field of Classification Search ........ 701/4, 5, 701/7, 8, 11, 14
See application file for complete search history.

(56) References Cited

U.S. PATENT DOCUMENTS

| | | | | |
|---|---|---|---|---|
| 5,920,321 | A * | 7/1999 | Owen et al. | 345/427 |
| 6,507,739 | B1 * | 1/2003 | Gross et al. | 455/431 |
| 6,522,958 | B1 * | 2/2003 | Dwyer et al. | 701/3 |
| 6,922,631 | B1 * | 7/2005 | Dwyer et al. | 701/206 |
| 234,608 | A1 | 10/2005 | Jaillant | |
| 7,676,303 | B2 * | 3/2010 | Hanel | 701/3 |
| 7,711,457 | B2 * | 5/2010 | Caillaud | 701/5 |
| 7,835,825 | B2 * | 11/2010 | Coulmeau et al. | 701/3 |
| 7,945,354 | B2 * | 5/2011 | Boorman et al. | 701/3 |
| 2007/0145184 | A1 | 6/2007 | Baudry | |
| 2007/0179703 | A1 * | 8/2007 | Soussiel et al. | 701/200 |
| 2008/0039984 | A1 * | 2/2008 | Bitar et al. | 701/3 |
| 2008/0312776 | A1 * | 12/2008 | Sylvester | 701/3 |

FOREIGN PATENT DOCUMENTS

| | | |
|---|---|---|
| FR | 2 841 977 | 1/2004 |
| FR | 2 847 553 | 5/2004 |

OTHER PUBLICATIONS

Preliminary Search Report dated Mar. 12, 2008 w/ English translation.

* cited by examiner

*Primary Examiner* — Hussein Elchanti
(74) *Attorney, Agent, or Firm* — Dickinson Wright PLLC

(57) ABSTRACT

Method and device for assisting the piloting of an aircraft. The device (1) comprises means (4) for determining, using a roll instruction and measured current values of external characteristics and of flight characteristics of the aircraft, a predicted path which is a flight path having a constant roll angel, taking account of the effect of the wind.

12 Claims, 2 Drawing Sheets

METHOD AND DEVICE FOR AIDING THE PILOTING OF AN AIRCRAFT

FIELD OF THE INVENTION

The present invention relates to a method and a device for assisting the piloting of an aircraft, in particular a transport aircraft.

BACKGROUND OF THE INVENTION

It is known that the lateral control of an aircraft, in particular of a civil or military transport aircraft, implemented by a usual autopilot device, can be carried out in general in three different ways, namely:
  by fixing a heading instruction;
  by fixing a track instruction; or
  by slaving the path of the aircraft to a path which is defined with respect to the ground (and which follows either a succession of beacons situated on the ground or GPS coordinates to be flown over), this path being called the flight plan.

These different piloting modes can be matched with a maximum roll limit which can be chosen by the pilot or which can be contained in the autopilot device. When there is a change of path, the roll rate is therefore kept within this maximum roll limit.

It is known that, during operations carried out by a civil or military aircraft, the aircraft can be brought to join (or acquire) a flight path horizontally and to do this whilst complying, during this acquisition phase, with a roll instruction which is imposed by the pilot. This flight path can notably be an in-flight refuelling path, an approach path or any other path which is defined geographically with respect to the ground. During such a flight phase, the impact of variables (aircraft speed, altitude, wind, etc.) and their variation with respect to time have a significant effect of the future path of the aircraft. Taking these variables into account is therefore essential for the correct completion of the flight path acquisition manoeuvre.

In the case of piloting by heading (or by track), only the heading (or the track) is considered as important. The autopilot device must therefore reach this heading (or track) instruction whilst complying with the structural and/or comfort limits of the passengers of the piloted aircraft. The position of the aircraft, when it has achieved this instruction, is not therefore known in advance because it depends on parameters which are variable such as the roll rate, the wind, etc.

Moreover, in the case of piloting according to a flight plan, the final position of the aircraft is known if and only if beacons situated on the ground can be selected in the zone in question. However, in order to carry out such piloting, it is necessary to modify the flight plan, such a modification representing a large amount of manipulation which is not very reactive (several seconds generally elapse before the instruction is taken into account).

Consequently, none of these usual solutions is completely satisfactory for automatically acquiring a flight path (in-flight refuelling path, approach path, etc.) in compliance with a roll instruction.

SUMMARY OF THE INVENTION

The present invention relates to a method for assisting the piloting of an aircraft, the purpose of which is to overcome the aforesaid disadvantages.

For this purpose, according to the invention, the said method is noteworthy in that:
a) a roll instruction for the aircraft is generated automatically;
b) the current values of flight characteristics of the aircraft (speed, heading, etc.) and the current values of characteristics of the wind existing outside of the aircraft (force, direction) are measured;
c) using the said roll instruction and the said measured current values:
  c1) a first path is calculated which exhibits a constant roll angle corresponding to the said roll instruction but which does not take account of the effect of the wind; and
  c2) the effect of the wind is integrated in this first path in order to obtain a predicted path which is at a constant roll angle and which takes account of the effect of the wind; and
d) this predicted path is used for assisting the piloting of the aircraft.

Thus, due to the invention, a predicted path is determined which represents a flight path that the aircraft will follow if it is piloted with a constant roll angle corresponding to the said roll instruction, this flight path being determined in such a way as to take account of the effect generated on the aircraft by the wind existing outside of the said aircraft.

Preferably, in step d) the said predicted path is displayed on a navigation screen of the aircraft. The pilot thus knows exactly the (effective) path that his aircraft will follow if it flies according to the said roll instruction, since the said predicted path takes account of the effect of the wind. This information can be particularly useful when the aircraft must join a flight path such as the aforesaid one, that is to say for example an in-flight refuelling path or an approach path.

The pilot of the aircraft can of course pilot that aircraft manually in such a way as to maintain a constant roll angle, according to the roll instruction generated in step a) and taken into account in the calculation of the said predicted path. However, in a particular embodiment, in step d), the said predicted path is transmitted to an autopilot device of the aircraft, which then automatically pilots the said aircraft according to the said predicted path, that is to say with a roll equal to the said roll instruction. This particular embodiment notably makes it possible to reduce the pilot's workload and to obtain precise piloting.

Advantageously, in step c1), there is determined, as a first path, a circular path of constant radius R and the said radius R is calculated using the following expression:

$$R = (Vtas^2/g)/\tan \phi$$

wherein:
  Vtas is the measured speed of the aircraft;
  g is the acceleration of gravity;
  tan is the tangent; and
  $\phi$ is the said roll instruction.

Moreover, in a preferred embodiment, in step c) the said predicted path is generated in the form of a series of points which are connected to each other by straight segments. In this case the said predicted path preferably comprises a number n of points P1 to Pn and each of the points Pp of this predicted path, where $1 \leq p \leq n$, has the following coordinates Xp and Yp in an aircraft reference system:

$$\begin{cases} Xp = R \cdot [1 - \cos(\pi \cdot p/n)] + R \cdot (\pi \cdot p/n) \cdot (Wsp/Vtas) \cdot \cos(Wdir - Hdg) \\ Yp = R \cdot \sin(\pi \cdot p/n) + R \cdot (\pi \cdot p/n) \cdot (Wsp/Vtas) \cdot \sin(Wdir - Hdg) \end{cases}$$

in which expressions:
R is the radius of the said first path;
Wsp is the measured force of the wind;
Vtas is the measured speed of the aircraft;
Wdir is the direction of the wind, measured and expressed in the aircraft reference system; and
Hdg is the measured heading of the aircraft.

The segmentation of the predicted path, such as mentioned above, notably simplifies the algorithms to be used in order to implement the method according to the invention. This segmentation is characterized in particular by:
a breakdown into a path without wind (basic trigonometry;
superimposition of a constant wind (constant drift);
display of the path in consecutive segments; and
a path (which results from the above) which is sufficiently precise and continuous.

In a particular embodiment:
in step c2), account is taken of an effect due to a turn of the aircraft following the said roll instruction, in order to determine the said predicted path; and/or
in step c), the predicted path is truncated, taking account of specific characteristics such as a particular overall angle of rotation (180° or 360° for example) of the aircraft or a particular flight duration.

Preferably at least the aforesaid steps b), c) and d) of the method according to the invention are carried out automatically and repetitively. Moreover, the roll instruction can be generated in step a) either by the pilot (manually) or automatically by an appropriate function which is integrated in an autopilot device.

Moreover, in a particular embodiment, at the end of step c) the following operations α and β are carried out repetitively:
α) a new roll instruction is determined making it possible to obtain a new predicted path which approaches a particular point; and
β) this predicted path is calculated taking account of this new roll instruction,
the said operations α and β being repeated until the predicted path obtained joins the said particular point. This particular point is preferably a waypoint that the aircraft must pass through. It can notably be the end of a segment of a path which it is desired to join and to do this tangentially in particular.

The present invention also relates to a device for assisting the piloting of an aircraft, in particular a transport aircraft.
According to the invention, the said device is noteworthy in that it comprises:
first means for generating a roll instruction for the aircraft;
second means for measuring the current values of flight characteristics of the aircraft and the current values of characteristics of the wind existing outside of the aircraft;
third means for calculating, using the said roll instruction and the said measured current values, a predicted path which is a flight path with a constant roll angle, taking account of the effect of the wind, the said third means comprising in order to do this:
an element for calculating a first path which exhibits a constant roll angle corresponding to the said roll instruction, but which does not take account of the effect of the wind; and
an element for integrating the effect of the wind in this first path in such a way as to obtain the said predicted path; and
fourth means, for example a display screen and/or an automatic pilot device, which use this predicted path for assisting the piloting of the aircraft.

BRIEF DESCRIPTION OF THE DRAWINGS

The figures of the appended drawing will give a good understanding of how the invention may be embodied. In these figures, identical references denote similar elements.

DETAILED DESCRIPTION OF THE INVENTION

Figure 1:
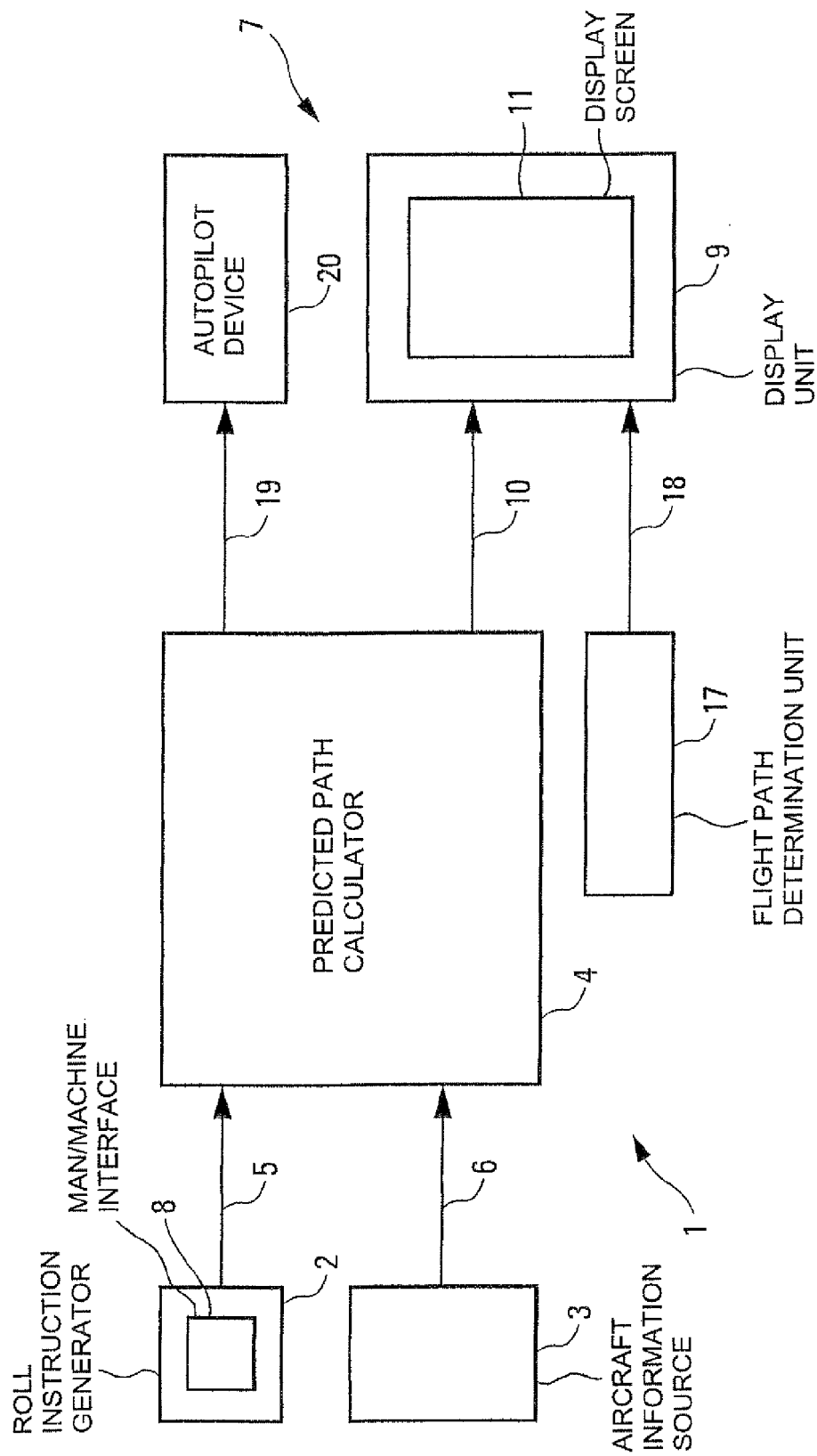
FIG. 1 is the block diagram of a device for assisting piloting according to the invention.

The device 1 according to the invention and shown as a block diagram in FIG. 1 is intended to assist the piloting of an aircraft (not shown), of a civil or military transport aircraft in particular.
According to the invention, the said device 1 comprises:
means 2, described below, for generating a roll instruction for the aircraft;
a set 3 of usual information sources. This set 3 comprises usual means for directly measuring (or for determining with the help of measurements), in a usual way, the current values of flight characteristics (or parameters) of the aircraft, such as its speed or its heading, and usual means for directly measuring (or for determining with the help of measurements), in a usual way, the current values of characteristics of the wind (notably its force and its direction) which exists outside of the aircraft;
means 4 which are connected by the intermediary of links 5 and 6 respectively to the said means 2 and to the said set 3 and which are formed in such a way as to calculate, as described below, with the help of the roll instruction received from the said means 2 and of the current (measured) values received from the said set 3, a predicted path Tp which is a flight path with a constant roll angle, taking account of the effect of the wind; and
means 7, described below, for using this predicted path Tp calculated by the said means 4 for the purpose of assisting the piloting of the aircraft.

According to the invention, the said means 4 comprise the following elements which are integrated and not shown specifically:
a first element for calculating a first (flight) path which has a constant roll angle corresponding to a roll instruction generated by the means 2, but which does not take account of the effect of the wind; and
a second element for integrating the effect of the wind in this first flight path, taking account of current values measured using the set 3, in such a way as to obtain the said predicted path Tp.

The device 1 therefore determines, as a function of short term instructions from the pilot (heading, track, roll) a predicted path Tp which takes account of characteristics of the aircraft, such as the maximum roll rate or the speed, and of external parameters such as the direction and force of the wind.

More precisely, the said first element of the said means 4 determines, as a first path, a circular path of constant radius R. In order to do this, the said first element calculates the said radius R using the following expression:

$$R = (Vtas^2/g)/\tan\phi$$

wherein:

Vtas is the measured speed of the aircraft;

G is the acceleration of gravity;

tan is the tangent; and

φ is the said roll instruction, received by the intermediary of the said means 2.

Moreover, the said second element of the said means 4 superimposes the effect of the wind (illustrated by the force and direction of the wind, measured by appropriate means of the said set 3) all along this first path. On order to do this, at each point of this first path, the said second element applies a translation of $\vec{T}=K.\vec{W}$, where $\vec{W}$ is the wind vector and K is a gain which is proportional to the position of the point in question on the first path.

Thus the means 4 determine a predicted path Tp which represents a flight path which the aircraft will follow if it is piloted with a constant roll angle corresponding to the said roll instruction. This flight path is determined in such a way as to take account of the effect generated on the aircraft by the wind that exists outside of the said aircraft and which will therefore act on the latter during the flight.

In a preferred embodiment, the said means 2 comprise a usual man/machine interface 8 which allows a pilot of the aircraft to enter the said roll instruction in the device 1. The said means 2 can also comprise automatic means (not shown) for example forming part of an autopilot device, which automatically determine a roll instruction, as described below.

Figure 2:
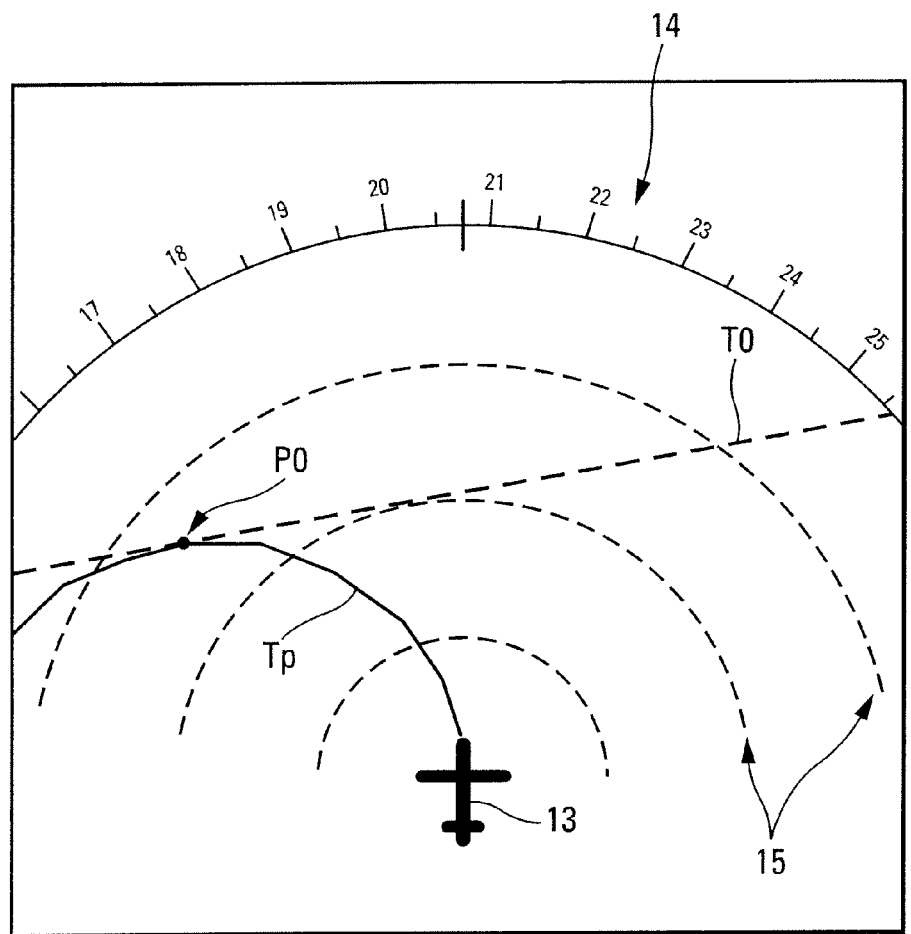
FIG. 2 is a diagrammatic illustration of the display on a navigation screen of a predicted path generated by a device according to the invention.

Moreover, in a preferred embodiment, the said means 7 comprise display means 9 which are connected by the intermediary of a link 10 to the said means 4 and which are able to display on a display screen 11, preferably a usual navigation screen, the predicted path Tp, as shown notably in FIG. 2.

Thus, the pilot knows exactly which real path his aircraft will (effectively) follow if it flies in accordance with the said roll instruction, since the said predicted path Tp takes account of the effect of the wind. This information can be particularly useful when the aircraft must join a flight path such as an in-flight refuelling path or an approach path for example.

FIG. 2 illustrates a usual display of navigation information on a navigation screen. This display notably comprises:

an aircraft symbol 13 which illustrates the actual position of the aircraft, which can notably be received by the display means 9 from the said set 3 of information sources. In the example of FIG. 2, the display mode shown is a usual mode called ARC, in which the aircraft symbol 13 has a fixed and centred position which is situated vertically at the bottom and horizontally at the centre of the display screen 11;

a heading scale 14; and a distance scale 15.

The aircraft data (speed, altitude, wind) used by the means 4 are measured at each instant and then assumed to be constant in the projection of the predicted path Tp presented on the display screen 11.

In a preferred embodiment, as shown in FIG. 2, the predicted path Tp is plotted in the same reference system as a flight path (or flight axis) T0 to be joined. This flight path T0 can be, notably, an in-flight refuelling path, an approach path or any other path which is defined geographically with respect to the ground (and which, for example, follows a succession of beacons situated on the ground or GPS coordinates to be flown over).

For this purpose, the device 1 comprises usual means 17, for example an FMS (Flight Management System), which are intended to determine, in the usual manner, the flight path T0 and which transmit this information by the intermediary of a link 18 to the said display means 9 (in order to display it).

Thus, by varying the roll instruction entered into the device 1 by means of the interface 8, the pilot will be able to make the predicted path Tp tangential to the flight path T0 to be joined, and thus use, simply and interactively, a manoeuvre of acquisition of this flight path T0. During the acquisition of the said flight path T0, any change in the instantaneous parameters used by the means 4 will of course have a repercussion on the predicted path Tp. In order to compensate for these external effects, the pilot will also simply and continuously adjust the roll instruction, which is entered using the interface 8 and according to which the aircraft is piloted, in such a way as to maintain the predicted path Tp tangential to the path T0 to be acquired.

The pilot can therefore pilot the aircraft manually in such a way as to maintain the roll constant, in accordance with the roll instruction which is taken into account in the calculation of the predicted path Tp. However, in a particular embodiment, the means 4 transmit the said predicted path Tp, by the intermediary of a link 19, to a usual autopilot device 20, which then pilots the said aircraft automatically according to the said predicted path Tp, that is to say with a roll equal to the said roll instruction. This particular embodiment notably makes it possible to reduce the pilot's workload and to obtain precise piloting.

In a particular embodiment, the said means 4 also take account of the effect to the aircraft going into a turn, following the said roll instruction, in order to determine the said predicted path Tp. This makes it possible to improve the precision of the predicted path Tp by taking account of the deformation resulting from the aircraft going into a turn which modifies the path, in particular if this going into a turn is strongly limited because of operational constraints.

The following case is considered by way of illustration: a turn with 25° of roll without wind. In this case, if the aircraft goes into a turn instantaneously (the roll changing from 0° to 25° instantaneously), the turn obtained would be equal to a circle of radius Ri such that Ri=(Vtas²/g)tan 25, where Vtas is the speed of the aircraft and 25° is the roll instruction. However, if the aircraft takes 50 seconds for example before reaching the roll rate of 25°, it will have started to turn during the first 25 seconds (the first second it will have for example a roll rate of 2°, the second second it will have a roll rate of 4°, etc.). During this transient phase (with a non-zero roll rate), the path will be modified. In order to refine the path Tp, the means 4 therefore take account of this transient phase in the aforesaid particular embodiment.

Moreover, in another embodiment (as a variant or as a complement), according to the pursued objective, the means 4 truncate the path Tp which is a convergent or divergent spiral, to a portion of the path, in particular a portion which presents a particular angle, for example 180° or 360°, or to a portion which corresponds to a particular flight duration of the aircraft.

In a particular embodiment, the device 1 takes account of a waypoint, for example the point P0 in FIG. 2, that the aircraft is required to join. This waypoint can notably correspond to the end of a segment of path which is required to be joined tangentially. In this particular embodiment, as a function of the determined predicted path Tp, the roll instruction is modified using the means 2 in order to join this waypoint P0 (and possibly to make a segment associated with this point tangential). The new roll instruction can be determined by the pilot who then enters it manually using the interface 8. It can also be determined automatically by an appropriate function of the autopilot device, which forms part of the said means 2. As a function of the new roll instruction, the means 4 recalculate a predicted path Tp, and the roll instruction is refined if necessary until the predicted path Tp joins the said waypoint P0 (this operation being carried out by successive iterations). During an in-flight refuelling, in order to guarantee the stability of the roll angle of the path, at least over sufficient time periods to allow the in-flight refuelling, the modification of the roll instruction is carried out only over a portion of path corresponding to the start of putting into a turn, and possibly on other predetermined portions of the turning path.

Figure 3:
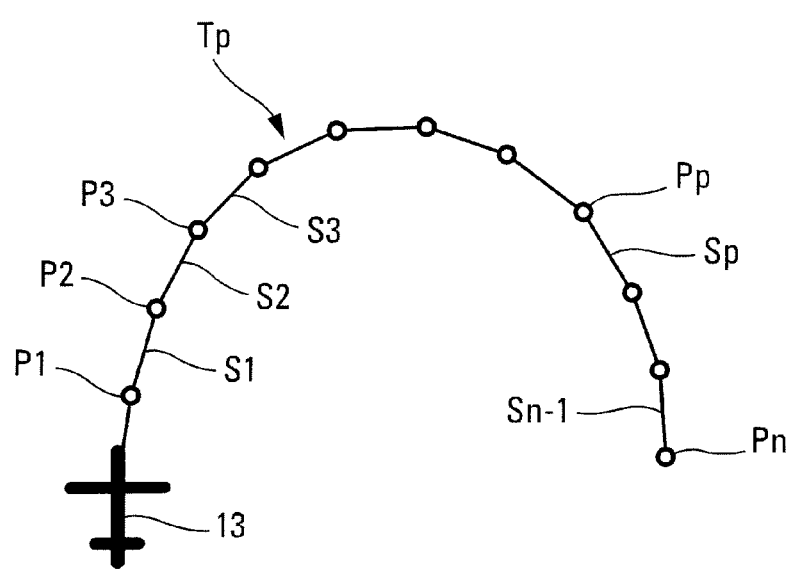
FIG. 3 is a graphical representation showing a particular example of a predicted path obtained using the device according to the invention.

Moreover, in a preferred embodiment, the means 4 replace the circle resulting from the calculation of the radius of the path by a series of successive points P1, P2, P3, . . . , Pp, . . . , Pn, which are connected to each other by straight segments S1, S2, S3, . . . , Sp, . . . , Sn−1, as shown in FIG. 3. In this case, n is an integer greater than 1 and p is such that $1 \leq p \leq n$.

The number n of points P1 to Pn depends on the calculating capability of the means 4 and on the resolution desired for the display which is used on the display screen 11. Once the number n of points is fixed, it is necessary to apply to each of the points P1 to Pn a deformation $\vec{T}p$ representative of the impact of the wind at that point Pp, which is calculated (preferably by the second element of the means 4) using the following expression:

$$\vec{T}p = (\vec{W}/Vtas).R.(p/n)$$

in which:
- $\vec{W}$ is the speed vector of the wind, measured using appropriate means forming part of the set 3;
- Vtas is the true speed of the aircraft, measured using appropriate means forming part of the set 3;
- R is the radius of the turn, calculated as described above by the first element of the means 4; and
- p is the number of the point in question.

The information relating to the wind is taken at the position of the aircraft and is extrapolated over the whole path. The coordinates Xp and Yp which result from the different points Pp of the path Tp, in the aircraft reference system (which comprises axes OX and OY, O being for example the centre of gravity of the aircraft, OX being parallel with the longitudinal axis of the aircraft and OY being perpendicular to the axis OX and passing through the plane formed by the wings of the aircraft) are defined by:

$$\begin{cases} Xp = X1 + Y1 \\ Yp = X2 + Y2 \end{cases}$$

where X1 and X2 represent a perfect semi-circle and Y1 and Y2 represent the effect of the wind and a weighting factor. These values satisfy the following expressions:

$$\begin{cases} X1 = R \cdot [1 - \cos(\pi \cdot p/n)] \\ X2 = R \cdot \sin(\pi \cdot p/n) \\ Y1 = R \cdot (\pi \cdot p/n) \cdot (Wsp/Vtas) \cdot \cos(Wdir - Hdg) \\ Y2 = R \cdot (\pi \cdot p/n) \cdot (Wsp/Vtas) \cdot \sin(Wdir - Hdg) \end{cases}$$

In this preferred embodiment, the predicted path Tp therefore comprises a number n of points P1 to Pn, and each of the points Pp of this predicted path Tp has the following coordinates Xp and Yp in the said aircraft reference system:

$$\begin{cases} Xp = R \cdot [1 - \cos(\pi \cdot p/n)] + R \cdot (\pi \cdot p/n) \cdot (Wsp/Vtas) \cdot \cos(Wdir - Hdg) \\ Yp = R \cdot \sin(\pi \cdot p/n) + R \cdot (\pi \cdot p/n) \cdot (Wsp/Vtas) \cdot \sin(Wdir - Hdg) \end{cases}$$

in which expressions:
- R is the radius of the said first path;
- Wsp is the force of the wind, which is measured by appropriate means of the set 3;
- Vtas is the true speed of the aircraft, which is measured by appropriate means of the set 3;
- Wdir is the direction of the wind, which is measured by appropriate means of the set 3 and which is projected into the aircraft reference system; and
- Hdg is the heading of the aircraft, which is measured by appropriate means of the set 3.

Subsequently, the path Tp is updated according to the updating of the measured parameters (speed, wind, roll, etc.).

The segmentation of the predicted path Tp, as described above, notably simplifies the calculations carried out by the means 4. This segmentation is characterized by:
- a breakdown into a (first) path without wind (basic trigonometry);
- the superimposition of a constant wind (constant drift);
- the display of the path in n−1 consecutive segments; and
- a path Tp (which derives from this) which is sufficiently precise and continuous to provide assistance to the piloting during the flight of the aircraft.

Moreover, it will be noted that the maximum roll rate can be used to limit the predicted path. Structurally, the aircraft cannot exceed a certain roll rate. The pilot is actually able to select all roll rates between 0 and the maximum roll rate allowed by the aircraft. However, in certain cases, this rate can be more limited (in the case of an engine failure it is, for example, limited to 25°). In this precise case, if the pilot selects a higher roll rate (30° for example), it must not lead the pilot into error by presenting him with a path corresponding to that roll rate, whereas in fact the automatic mechanisms of the aircraft will limit it to a path corresponding to 25°.

The invention claimed is:

1. Method for assisting the piloting of an aircraft, the method comprising:
   a) generating a roll instruction for the aircraft;
   b) measuring current values of flight characteristics of the aircraft and current values of wind characteristics existing outside of the aircraft;
   c) calculating a predicted path according to the generated roll instruction and the measured current values of wind characteristics by:
      c1) calculating a first path which exhibits a constant roll angle corresponding to the generated roll instruction but which does not take account of the current values of the wind characteristics; and
      c2) integrating the current values of the wind characteristics into the first path to obtain a predicted path which is at a constant roll angle; and
   d) following calculating the predicted path, carrying out the following operations α and β repetitively:
      α) determining a new roll instruction based on the predicted path to obtain a new predicted path which approaches a particular point (P0): and
      β) repeating calculation of the new predicted path based on a new roll instruction until the new predicted path joins the particular point.

2. Method according to claim 1, wherein the predicted path is displayed on a navigation screen of the aircraft.

3. Method according to claim 1, wherein the predicted path is transmitted to an autopilot device of the aircraft, which then automatically pilots the said aircraft according to the said predicted path, wherein the aircraft is piloted with a roll angle equal to the said roll instruction.

4. Method according to claim 1, wherein the first path is determined as a circular path of constant radius R and the said radius R is calculated using the following expression:

$$R = (Vtas^2/g)/\tan \phi$$

wherein:
- Vtas is the measured speed of the aircraft;
- g is the acceleration of gravity;

tan is the tangent; and

φ is the said roll instruction.

5. Method according to claim 1, wherein the said predicted path is generated in the form of a series of points which are connected to each other by straight segments.

6. Method according to claim 5, wherein the predicted path Tp comprises a number n of points P1 to Pn, and each of the points Pp of the predicted path, with $1 \leq p \leq n$, has the following coordinates Xp and Yp in an aircraft reference system:

$Xp=R.[1-\cos(\pi.p/n)]+R(\pi.p/n).(Wsp/Vtas).\cos(Wdir-Hdg)$ $Yp=R.\sin(\pi.p/n)+R(\pi.p/n)(Wsp/Vtas)\sin(Wdir-Hdg)$ in which expressions:
R is the radius of the said first path;
Wsp is the measured force of the wind;
Vtas is the measured speed of the aircraft;
Wdir is the direction of the wind, measured and projected into the aircraft reference system; and
Hdg is the measured heading of the aircraft.

7. Method according to claim 1, wherein step c2) takes into account an effect due to a turn of the aircraft following the said roll instruction, in order to determine the said predicted path.

8. Method according to claim 1, wherein b), c) and d) are carried out automatically and repetitively.

9. Method according to claim 1, wherein the particular point corresponds to the end of a segment of path which the aircraft is required to join tangentially.

10. Device for assisting the piloting of an aircraft, the said device comprising:
roll instruction generator that generates a roll instruction for the aircraft;
aircraft information source that measures current values of flight characteristics of the aircraft and current values of wind characteristics existing outside of the aircraft; and
predicted path calculator that calculates, according to the generated roll instruction and the said measured current values, a predicted path which is a flight path with a constant roll angle, the predicted path calculator comprising:
a first element that calculates a first path which exhibits a constant roll angle corresponding to the generated roll instruction, but which does not take account of the current values of the wind characteristics; and
a second element that integrates the current values of the wind characteristics into the first path to obtain the said predicted path;
wherein
the predicted path calculator comprises a first unit that determines a new roll instruction based on the predicted path to obtain a new predicted path which approaches a particular point and a second unit that repeatedly calculates the new predicted path taking account of the new roll instruction until the new predicted path joins the particular point.

11. A method for assisting the piloting of an aircraft, the method comprising:
a) generating a roll instruction for the aircraft;
b) measuring current values of flight characteristics of the aircraft and current values of wind characteristics existing outside of the aircraft;
c) calculating a predicted path according to the generated roll instruction and the measured current values of wind characteristics by:

c1) calculating a first path which exhibits a constant roll angle corresponding to the generated roll instruction but which does not take account of the current values the wind characteristics, wherein the first path is determined as a circular path of constant radius R and the said radius R is calculated using the following expression:

$R=(Vtas^2/g)/\tan \phi$ wherein:
Vtas is the measured speed of the aircraft;
g is the acceleration of gravity;
tan is the tangent; and
φ is the said roll instruction; and c2) integrating the current values of the wind characteristics into the first path to obtain a predicted path (Tp) which is at a constant roll angle; and d) following calculating the predicted path, carrying out the following operations α and β repetitively:
α) determining a new roll instruction based on the predicted path to obtain a new predicted path which approaches a particular point; and
β) repeating calculation of the new predicted path based on a new roll instruction until the new joins the particular point.

12. A method for assisting the piloting of an aircraft, the method comprising:
a) generating a roll instruction for the aircraft;
b) measuring current values of flight characteristics of the aircraft and current values of wind characteristics existing outside of the aircraft;
c) calculating a predicted path according to the generated roll instruction and the measured current values of wind characteristics by:

c1) calculating a first path which exhibits a constant roll angle corresponding to the generated roll instruction but which does not take account of the current values the wind characteristics; and c2) integrating the current values of the wind characteristics into the first path to obtain a predicted path which is at a constant roll angle, wherein
the predicted path Tp comprises a number n of points P1 to Pn, and each of the points Pp of the predicted path, with $1 \leq p \leq n$, has the following coordinates Xp and Yp in an aircraft reference system:

$Xp=R.[1-\cos(\pi.p/n)]+R(\pi.p/n).(Wsp/Vtas).\cos(Wdir-Hdg)$ $Yp=R.\sin(\pi.p/n)+R(\pi.p/n)(Wsp/Vtas)\sin(Wdir-Hdg)$ in which expressions:
R is the radius of the said first path;
Wsp is the measured force of the wind;
Vtas is the measured speed of the aircraft;
Wdir is the direction of the wind, measured and projected into the aircraft reference system; and
Hdg is the measured heading of the aircraft; and d) following calculating the predicted path, carrying out the following operations α and β repetitively:
α) determining a new roll instruction based on the predicted path to obtain a new predicted path which approaches a particular point; and
β) repeating calculation of the new predicted path based on a new roll instruction until the new joins the particular point.

* * * * *